United States Patent [19]

Amada et al.

[11] Patent Number: 4,839,680
[45] Date of Patent: Jun. 13, 1989

[54] METHOD AND DEVICE FOR DRIVING LENS SHUTTER

[75] Inventors: Mitsumasa Amada, Soka; Hitosi Sibasaki, Funabashi; Masami Nagasaka, Kiyose, all of Japan

[73] Assignee: Mamiya Camera Co., Ltd., Tokyo, Japan

[21] Appl. No.: 133,479

[22] Filed: Dec. 15, 1987

[30] Foreign Application Priority Data

Dec. 27, 1986 [JP] Japan .................................. 61-314535
Jan. 20, 1987 [JP] Japan .................................. 62-9078

[51] Int. Cl.⁴ .......................... G03B 9/22; G03B 9/52
[52] U.S. Cl. .................................. 354/233; 354/234.1
[58] Field of Search .............................. 354/233, 234.1

[56] References Cited
FOREIGN PATENT DOCUMENTS 57-186738 11/1982 Japan .
61-51786 11/1986 Japan .

*Primary Examiner*—Michael L. Gellner
*Attorney, Agent, or Firm*—Pollock, VandeSande & Priddy

[57] ABSTRACT

A method of driving a lens shutter of an interchangeable lens for a single-lens reflex camera comprises steps of charging the lens shutter, opening shutter blades of the lens shutter, closing the shutter blades and releasing the lens shutter by rotations of a reversible motor in one direction and a reverse direction. A device for driving a lens shutter of an interchangeable lens for a single-lens reflex camera comprises a driving a ring, a reversible motor for driving ring, position detecting unit for detecting rotated position and rotating directions of the driving ring, and control means for controlling rotations of the motor. The driving ring is driven in one direction during which the lens shutter is charged and shutter blades of the lens shutter are opened, while in a reverse direction during which the shutter blades are closed and the lens shutter is released. As an alternative, an operating ring is provided in addition to the driving ring. In this case, the driving ring is driven in one direction during which the lens shutter is charged and in a reverse direction during which the lens shutter is released. The operating ring is engaged with the driving ring at ends of the normal and reverse rotations of the driving ring to rotate in charging direction during which the shutter blades are opened, and in releasing direction during which the shutter blades are closed and the lens shutter is released.

14 Claims, 11 Drawing Sheets

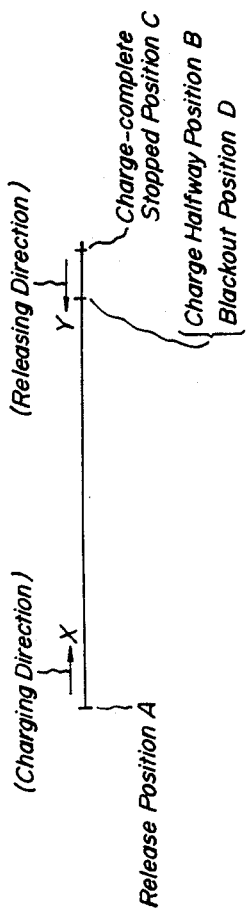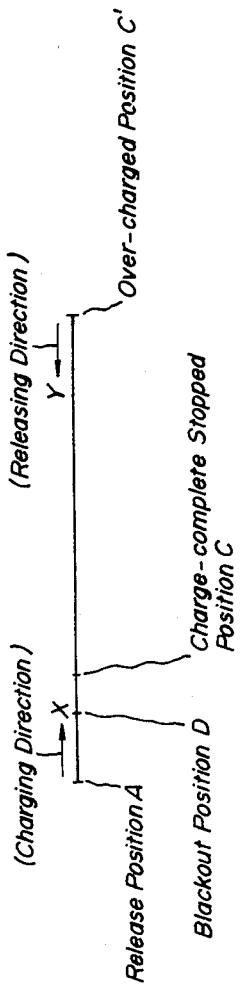

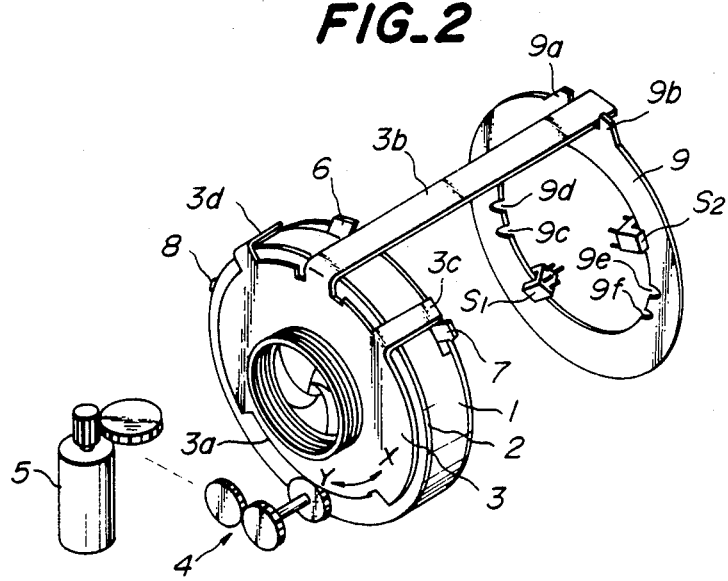
FIG_2
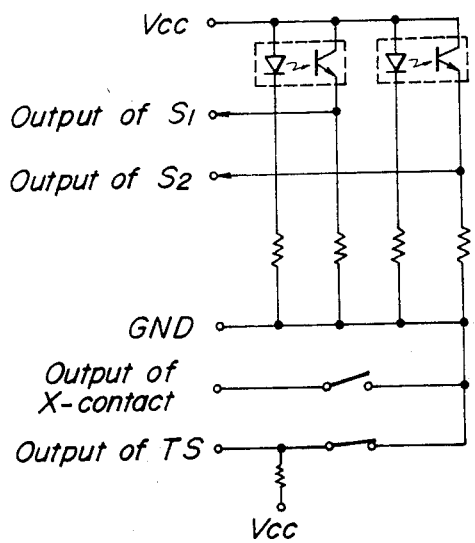
FIG_4

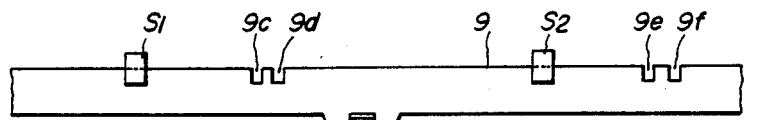
FIG.3a
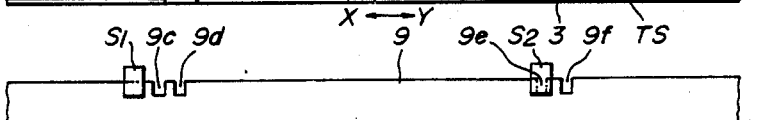
FIG.3b
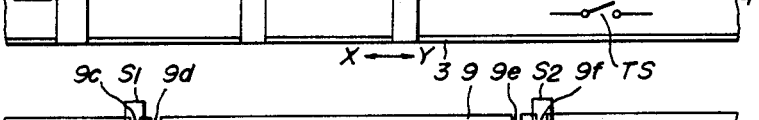
FIG.3c
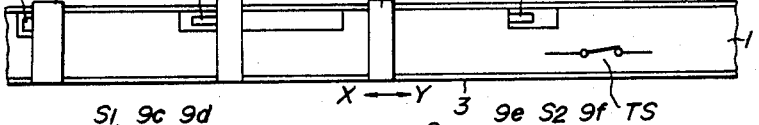
FIG.3d
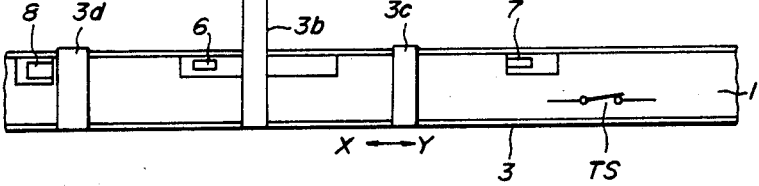

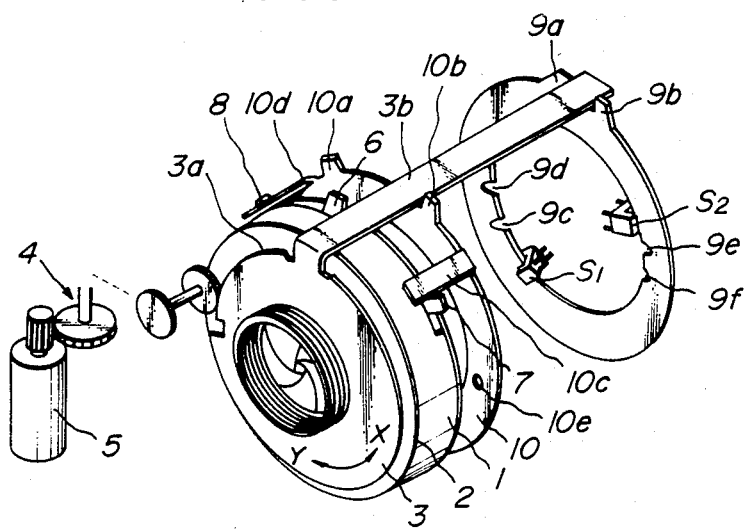

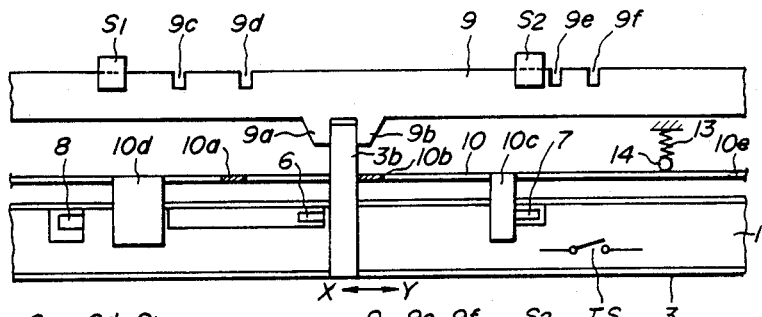
FIG_8a
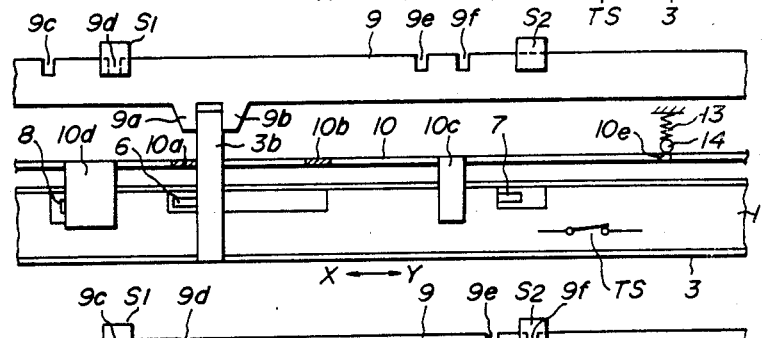
FIG_8c'
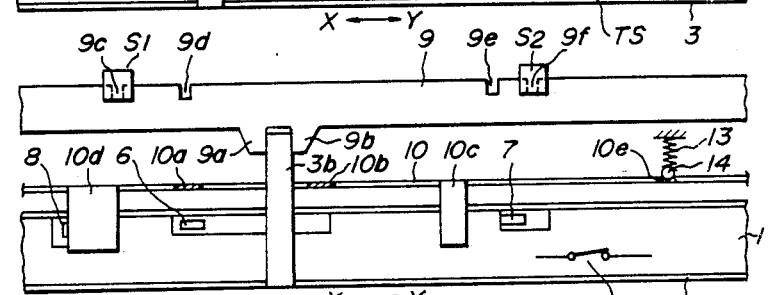
FIG_8c
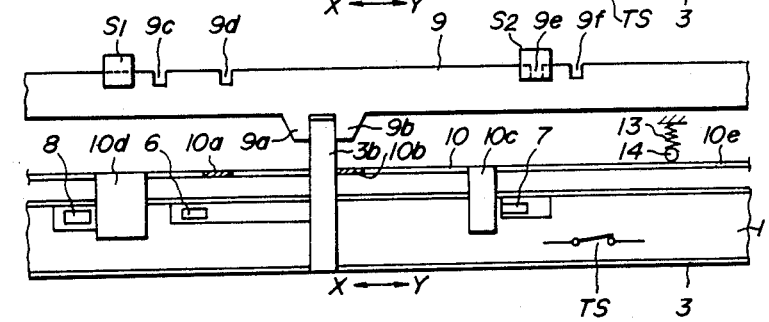
FIG_8d

FIG_9
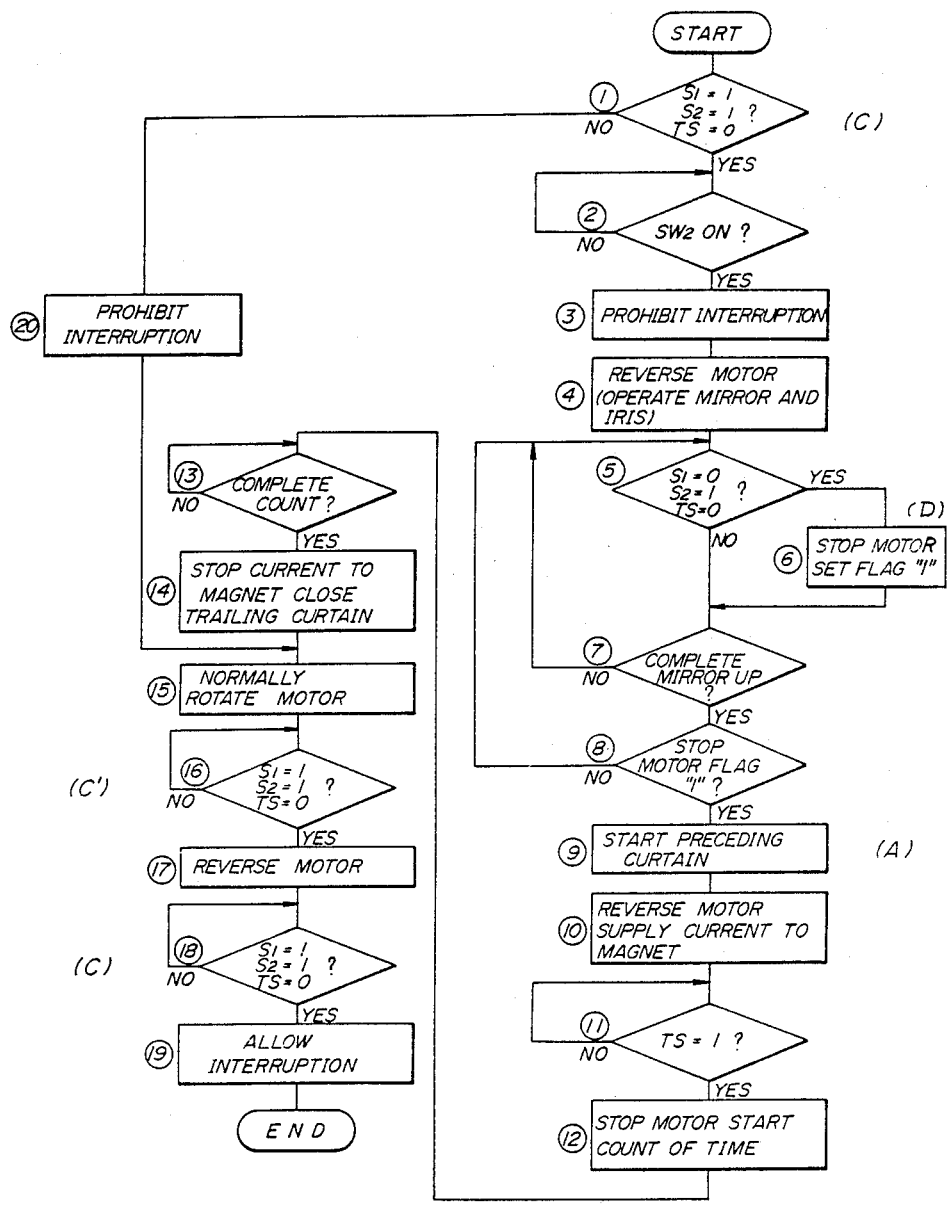

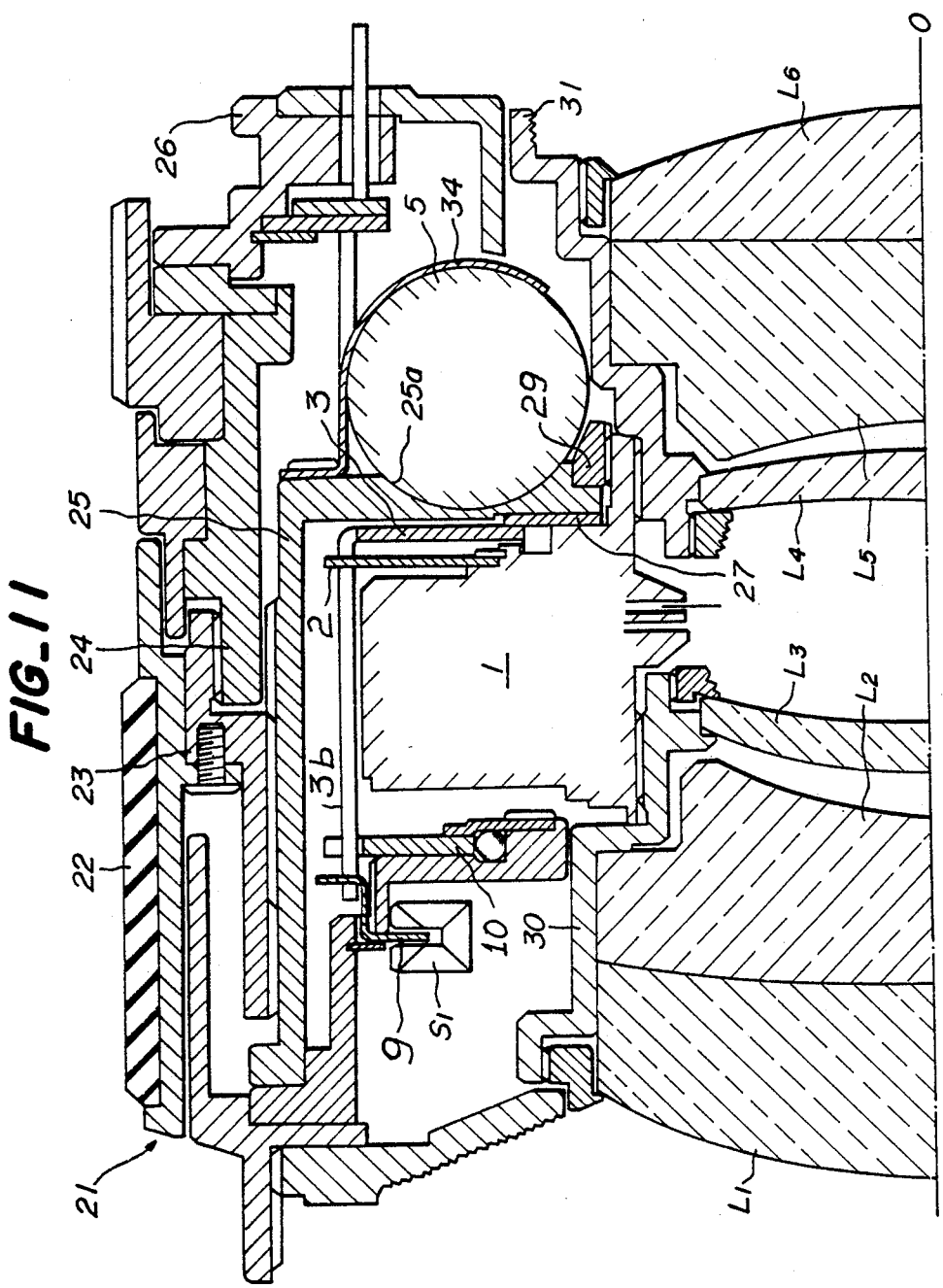

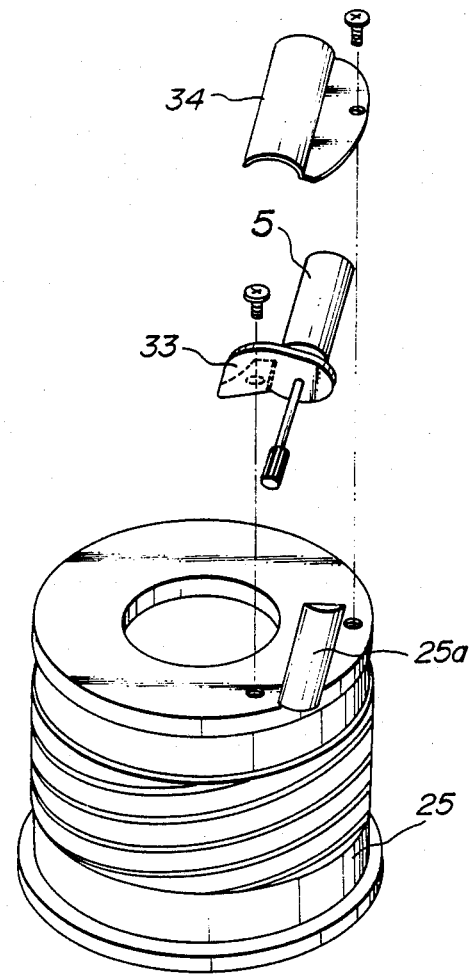
FIG_12

METHOD AND DEVICE FOR DRIVING LENS SHUTTER

BACKGROUND OF THE INVENTION

This invention relates to a method and a device for driving a lens shutter which is particularly built in a lens to be equipped on a single-lens reflex camera with or without a focal plane shutter.

In a single-lens reflex camera, a focal plane shutter has no mechanical connection with components on a lens side and therefore provides a large freedom in design of lenses in comparison with the lens shutter, thereby enabling construction of interchangeable lens to be simplified. Moreover, the focal plane shutter is able to shut off film surfaces with ease and to obtain higher shutter speeds in comparison with lens shutters. Therefore, the focal plane shutter is mainly used for single-lens reflex cameras capable of using interchangeable lens.

On the other hand, however, the focal plane shutter has a relatively narrow range in synchronism with an electronic flashing. In photographing subjects moving at high speeds, moreover, there is a risk of images being distorted with the focal plane shutter. Therefore, it has been desirable for the single-lens reflex camera to be able to use interchangeable lenses having shutters built therein which do not have the above disadvantages.

However, a hitherto used single-lens reflex camera having a focal plane shutter does not have driving means for a lens shutter. Therefore, when the camera body is equipped with an interchangeable lens having a lens shutter built therein, charging the focal plane shutter on the side of the camera body by winding-up has been effected separately from charging the lens shutter in the interchangeable lens.

In such a method of driving lens shutters, it is necessary to charge a lens shutter on the side of the interchangeable lens manually as well as winding-up on the camera body every time when photographing. Therefore, there is a difficulty in operation and a photographing operation is often carried out erroneously without charging the lens shutter, so that photographing is impossible at a valuable shutter chance.

In order to avoid such disadvantages, in addition to focal plane shutter charging means, lens shutter charging means may be provided on the camera body. With such an arrangement, however, the construction on the side of the camera body is considerably complicated, making the camera to be bulky and expensive and causing various troubles in operation.

Moreover, Japanese Patent Application Publication No. 51,786/86 discloses driving means for driving a lens shutter built in an interchangeable lens to be provided on a single-lens reflex camera having no focal plane shutter. This lens shutter includes swing levers concentrically urged in a direction opposite to a setting direction, and a setting ring for setting the swing levers against the urging forces. When the setting ring is rotated in the setting direction against the urging forces, the shutter is set and after an iris and shutter blades are opened, the swing levers are anchored at the set positions, while only the setting ring is rotated in the reverse direction to its original position.

When a release is effected, the swing levers are released so as to be rotated in the direction opposite to the setting direction by the urging force, and after the shutter blades are closed and the iris is stopped down to a set value, the lens shutter is released to open and close the shutter blades in a set time.

With the driving means disclosed in the Japanese Patent Application Publication No. 51,786/86, the setting ring is driven in normal and reverse directions by a reversible motor as a driving source provided on a lens board integrally connected to the lens shutter.

Moreover, an engaging lever for anchoring the swing levers set by the setting ring is provided with a first engaging portion for anchoring the swing levers at a set portion, and a second engaging portion for once stopping the swing levers on the way of rotation in the direction opposite to the setting direction. A release magnet is provided to actuate the engaging lever into an engaging position and is connected to a power source in series with a switch which is turned on by pressing a shutter button and with a switch which is turned off on an upward pivotal movement of a light cut-off plate. With this arrangement, the swing levers set by the setting ring are returned by turning the magnet on, and on the way of the returning movement, the swing levers are once stopped at the second engaging portion of the engaging lever. The engagement of the swing levers is released on the upward pivotal movement of the light cut-off plate to effect the shutter release.

In the driving means disclosed in the Japanese Patent Application Publication No. 51,786/86, the motor rotatively drives in the normal and reverse directions the setting ring which in turn drives in the setting direction the swing levers. However, the swing levers are rotated in the opposite direction in returning movement by a spring force without being driven by the motor.

Accordingly, it is required to provide the engaging lever for anchoring the swing levers against the urging force and the release magnet for actuating the engaging lever against the urging force in the anchoring direction. Moreover, owing to shocks upon returning of the swing levers there is a risk of the engaging lever being damaged which engages the swing levers on the way of returning, thereby making impossible the engagement between the engaging lever and the swing levers. Furthermore, a shock on releasing the shutter may cause a camera movement.

Therefore, it is considered that a preferable method is to build the motor for driving the lens shutter in a lens barrel which is electrically connected to the camera body.

A lens barrel having a motor built therein has been disclosed in Japanese Laid-open Patent Application No. No. 57-186,738 wherein a motor is located on an outer side of the barrel in the proximity of iris means where light rays converged so that an axis of the motor is parallel with an axis of a lens shutter.

Although such an arrangement of the motor is effective for a lens barrel having no lens shutter, a longitudinal end of the motor will interfere with diverging light rays. Therefore, it is very difficult to arrange the motor on the lens barrel.

SUMMARY OF THE INVENTION

It is a primary object of the invention to provide a method and a device for driving a lens shutter, which eliminates all the disadvantages of the prior art.

It is another object of the invention to provide a lens barrel having a lens shutter built therein, which is preferably used for the device for driving the lens shutter.

In order to achieve these objects, the method of driving a lens shutter built in a lens barrel to be equipped on a single-lens reflex camera according to the invention comprises steps of charging said lens shutter, opening shutter blades of the lens shutter, closing said shutter blades and releasing said lens shutter by rotations of a reversible motor in one direction and a reverse direction.

The device for driving a lens shutter built in a lens to be equipped on a single-lens reflex camera according to the invention comprises a driving ring for charging said lens shutter and then opening shutter blades of the lens shutter by rotation of said driving ring in one direction and for closing said shutter blades and then releasing said lens shutter by rotation of said driving ring in a reverse direction, a motor for driving said driving ring in normal and reverse directions, position detecting means for detecting rotated position and rotating directions of said driving ring, and control means for controlling rotations of said motor in the normal and reverse directions with the aid of output signals from said position detecting means.

In a further aspect, the device for driving a lens shutter built in a lens to be equipped on a single-lens reflex camera according to the invention comprises a driving ring for charging said lens shutter by rotation of said driving ring in one direction and for releasing said lens shutter by rotation of said driving ring in a reverse direction, a motor for driving said driving ring in normal and reverse directions, an operating ring engaging said driving ring at ends of the normal and reverse rotations of the driving rings to rotate in charging and releasing directions together with the driving ring for opening shutter blades of said lens shutter by the rotation in the charging direction and closing said shutter blades and then releasing said lens shutter by the rotation in the release direction, position detecting means for detecting rotated positions and rotating directions of said driving ring, and control means for controlling rotations of said motor in the normal and reverse directions with the aid of output signals from said position detecting means. With the above method and the device, any driving means complicated in construction for driving the lens shutter on the interchangeable lens need not be provided on the side of the camera body. Only an electric connection by a flexible substrate is needed. Therefore, a lens shutter can be driven with ease, even if it is built in a long focus lens whose moving stroke is long or in a shiftable or swingable lens.

According to the invention, a motor for driving the lens shutter can be provided at a location relatively near to iris means where light rays do not diverge. The motor is integrally provided on the lens barrel such that an axis of the motor is substantially perpendicular to an axis of the lens shutter. Therefore, the lens barrel is very compactly constructed without interference of a longitudinal end of the motor with the diverged portions of the light rays. Such an interference would occur in the prior art arrangement wherein axes of the motor and the lens shutter are arranged in parallel with each other.

Moreover, as the lens shutter is driven by the motor integrally provided with the lens shutter, the lens shutter can be very slightly driven without exerting any undue force on the camera body even in case of a long focus lens whose moving stroke is long or shiftable or swingable lens.

The invention will be more fully understood by referring to the following detailed specification and claims taken in connection with the appended drawings.

BRIEF DESCRIPTION OF THE DRAWINGS

FIG. 1 illustrates steps of driving a lens shutter according to the invention.

FIG. 2 is an exploded perspective view of one embodiment of the invention on a rear side;

FIGS. 3a-3b are explanatory development views illustrating driven positions of the components of the device according to the invention;

FIG. 4 illustrates one example of an electric circuit for use in the invention;

FIG. 5 shows different steps of driving a lens shutter according to the invention;

FIG. 6 is an exploded perspective view of another embodiment of the invention on a rear side;

FIG. 7 is an exploded perspective view of principal parts of the embodiment shown in FIG. 6 on a front side;

FIGS. 8a-8b are explanatory development views illustrating driven position of the components of the device shown in FIGS. 6 and 7;

FIG. 9 is a flow chart showing a driving sequence for a lens shutter according to the invention;

FIG. 11 is a longitudinal sectional view illustrating an upper half of a lens barrel according to the invention;

FIG. 12 is an exploded perspective view of principal parts for mounting a motor shown in FIG. 11;

DESCRIPTION OF THE PREFERRED EMBODIMENT

Figure 10A:
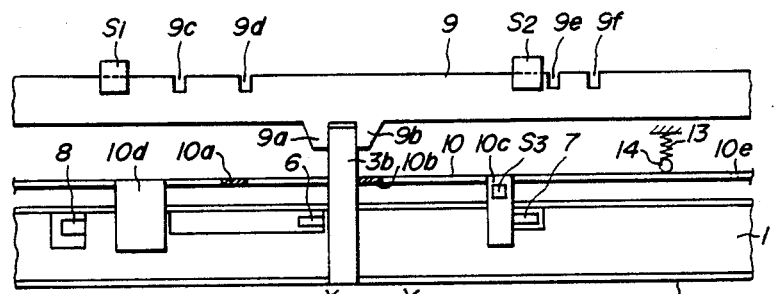
FIGS. 10a-10b are explanatory development views illustrating driven positions of the components of a further embodiment of the invention.
Figure 10C:
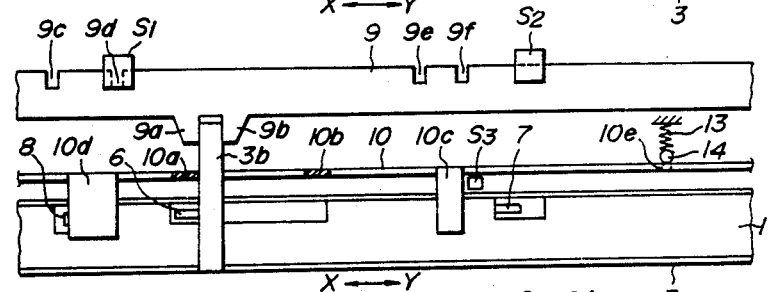
Figure 10C:
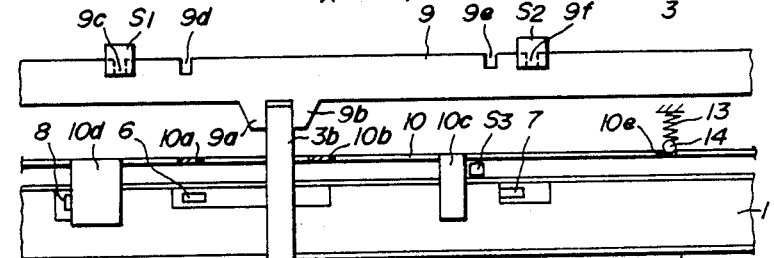
Figure 10D:
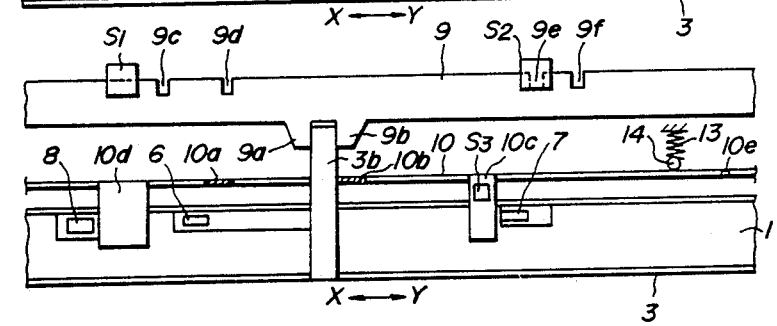

Before explaining embodiments of the invention, the operation of a lens shutter for a single-lens reflex camera used in the invention will be explained referring to FIG. 1.

This lens shutter is so constructed that by rotating in one direction a driving ring concentric to the shutter, the shutter is charged and then shutter blades are opened, and by rotating the driving ring in an opposite direction, the shutter blades are closed and the shutter is then released.

Referring in more detail to FIG. 1, the driving ring is driven from a release position A against spring actions of a driving spring and a return spring in a direction shown by an arrow X in FIG. 1 through a charge halfway position B into an over-charged condition. Thereafter, the driving ring is slightly returned into a direction shown by an arrow Y by the return spring and anchored under an energy-accumulated condition and held at a charge-complete stopped position C.

In photographing, when the driving ring is released and returned by the return spring in the direction Y, the shutter blades of the lens shutter under an opened condition are first closed into a blackout position D. Then a mirror is pivotally moved upward and thereafter a light cut-off plate is also pivotally moved upward.

Together with these operations, an iris ring geared with the driving ring is rotated to stop down an iris to a predetermined value. Thereafter, the driving ring drives a release to open and close the shutter blades so as to effect an exposure. The driving ring is at the release position A and stays at the position A until a next winding-up.

With a lens shutter having a quick return mechanism, after the operation of the shutter, the light cut-off plate and the mirror are pivotally moved downward progressively and after the iris is opened, the shutter blades are opened.

In using such a lens shutter for a single-lens reflex camera, according to the invention the driving ring is connected to a reversible motor capable of rotating in normal and reverse directions. The lens shutter is charged and then the shutter blades are opened by the rotation of the motor in one direction, while the lens shutter is released by the rotation of the motor in the other direction. Moreover, the motor on the side of the lens is connected to a lens shutter driving circuit on the side of a camera body, so that the lens shutter on the side of the lens is operated in synchronism with the operations of the focal plane shutter and the mirror or the light cut-off plate on the side of the camera body without requiring any mechanical linking mechanism between members of the sides of the lens and the camera body.

With this arrangement, a lens shutter can be driven in synchronism with operations of members on the side of the camera body even if using a lens shutter built-in swingable lens or a lens whose moving stroke is very long.

Concrete embodiments of the invention will be explained in detail hereinafter.

FIG. 2 is a perspective view of a lens shutter driving device as one embodiment of the invention viewed from a rear side thereof.

A lens shutter 1 fixed in a lens barrel (not shown) is constructed in the similar manner to that of the lens shutter widely used for single-lens reflex cameras. An iris ring 2 and a driving ring 3 are arranged on a rear side rotatably and concentric to the lens shutter 1. The iris ring 2 and the driving ring 3 are connected to each other.

The driving ring 3 is in the form of a disc formed with a tooth portion 3a and bent portions 3b, 3c and 3d. The tooth portion 3a is connected through a reduction gear train 4 to a reversible motor 5 capable of rotating in normal and reverse directions. The bent portions 3b, 3c and 3d are adapted to be engaged with a charge lever 6, a release lever 7 and a blade opening lever 8, respectively.

Moreover, a positioning ring 9 is rotatably provided on a front side of and concentric to the lens shutter 1. The positioning ring 9 is formed with projections 9a and 9b between which the bent portion 3b is embraced to cause the positioning ring 9 to rotate together with the driving ring 3.

The positioning ring 9 is further formed with two sets of notches 9c and 9d and 9e and 9f and is provided with first and second sensors $S_1$ and $S_2$. Each of the sensors is arranged so as to embrace the positioning ring 9 and comprises a transmission type photo-interrupter consisting of a light emission portion such as LED or the like and a light reception portion such as phototransistor arranged in a pair in opposition to each other. Rotating positions of the driving ring 3 rotated together with the positioning ring 9 can be detected from relative positions between the notches 9c, 9d, 9e and 9f and the first and second sensors $S_1$ and $S_2$.

However, it could not be detected whether the driving ring 3 is rotated in the direction X for charging or in the direction Y for releasing, only by the above detecting means. In case of the lens shutter 1 controlled by electronics, thereafter, a normally closed trigger switch TS (FIG. 3) is added, which is adapted to turn off at the beginning of opening of the shutter blades to cause the count of exposure time to start. In this manner, information of three bits are obtained by the first and second sensors $S_1$ and $S_2$ and the trigger switch TS. The motor 5 is controlled on the basis of the information in synchronism with the respective operating members on the side of the camera body to drive the lens shutter 1 in a predetermined operation sequence.

FIGS. 3a–3d schematically illustrate in development views respective relative positions between the first and second sensors $S_1$ and $S_2$, the trigger switch TS and the positioning ring 9 rotated together with the driving ring 3 in respective operating positions. FIGS. 3a, 3b, 3c and 3d illustrate the release position A, the charge halfway position B, the charge-complete stopped position C and the blackout position D, respectively.

In other words, FIG. 3a illustrates the driving ring 3 at the stopped position when the release has been completed, which position corresponds to that of FIG. 2. In this position, the driving ring 3 and the positioning ring 9 accompanied thereby have been driven in the direction Y by the rotation of the motor 5 in the release direction. In FIG. 3a the driving ring 3 and the positioning ring 9 are in their extreme positions on the right side in the drawing.

In this position, the bent portion 3c of the driving ring 3 has driven the release lever 7 to the right side viewed in FIG. 3a against its urging force to actuate a shutter blade closing and opening mechanism (not shown).

The notches 9c, 9d, 9e and 9f of the positioning ring 9 are positioned spaced from the first and second sensors $S_1$ and $S_2$ so that the trigger switch TS is maintained in the opened position.

When the motor 5 is then energized in the charging direction to drive the driving ring 3 in the direction X, the charge lever 6 is driven and displaced by the bent portion 3b into the charging direction against its urging force. On the other hand, the release lever 7 is released from the restriction of the bent portion 3c of the driving ring 3 and passes through a charge halfway position as shown in FIG. 3b where a shutter driving member (not shown) is anchored in the charged position.

When the driving ring 3 is then further rotated in the direction X, the charge lever 6 is driven to an overcharged position by the bent portion 3b, and the blade opening lever 8 normally urged to its closed position is driven into a blade opening direction against its urging force by the bent portion 3d of the driving ring 3. Thereafter, an inner surface of the bent portion 3d engages a tip end of the rotated blade opening lever 8 to keep the shutter blades in the opened position. As soon as the notch 9c of the positioning ring 9 becomes in alignment with the first sensor $S_1$, the motor 5 is deenergized.

As a result, the charge lever 6 is slightly returned by an urging force of a driving member in the lens shutter 1 into the release direction or the direction Y and maintained in the charged condition by the release lever 7 which is in the charge-complete stopped position shown in FIG. 3c.

In photographing, upon actuating a release button on the camera body, the motor 5 is started to rotate the driving ring 3 in the direction Y so as to release the blade opening lever 8 restrained by the bent portion 3d. At the same time, the notch 9e of the positioning ring 9 becomes in alignment with the second sensor S2, so that the blade opening lever 8 returns by its urging force to close the shutter blades, which is in the blackout position shown in FIG. 3d. Thereafter, the bent portion 3c of the driving ring 3 drives the release lever 7 to open and close the shutter blades so as to effect an exposure. The lens shutter 1 and the driving ring 3 are returned to the positions shown in FIG. 3a.

In this case, 1 (one) is assumed to indicate a status that the first or second sensor $S_1$ or $S_2$ is aligned with any one of the notches 9c-9f of the positioning ring 9 to turn on or a status that in releasing the lens shutter, the normally closed trigger switch TS is turned off in order to start to count the exposure time and start to open the shutter blades. And 0 (zero) is assumed to indicate a status that the first or second sensor $S_1$ or $S_2$ is not aligned with any one of the notches 9c-9f to turn off or a status that after the shutter operation, the normally closed trigger switch TS is turned on. The positional information in the respective positions shown in FIGS. 3a-3d are as in Table 1.

TABLE 1

|     |                               | $S_1$ | $S_2$ | TS |
| --- | ----------------------------- | ----- | ----- | -- |
| (A) | Release position              | 0     | 0     | 1  |
| (B) | Charge halfway position       | 0     | 1     | 1  |
| (C) | Charge complete stopped position | 1  | 1     | 0  |
| (D) | Blackout position             | 0     | 1     | 0  |

These three bit information are inputted into a control device equipped with a CPU built in a single-lens reflex camera to control the motor 5 in synchronism with operations of a mirror operating member, an iris operating member, and a focal plane shutter.

A pulse motor may be used as the driving motor 5 and actuated in synchronism with various operating members in the camera body. As a high speed and high torque pulse motor is not available yet which is compact sufficient to be enclosed in a lens barrel, it is preferable to use a high output coreless motor superior in rising performance and controlling characteristics.

FIG. 4 illustrates one example of an electric circuit to be built in a lens shutter.

In the lens shutter driving method as above described, however, the stroke from the charge complete stopped position (C) through the blackout position (D) to release position (A) in the direction Y is very long, and the output of the motor for driving the lens shutter is considerably slowed down through the reduction gear train to produce high torque Therefore, a time lag from releasing on the side of the camera body to the actual opening and closing of the lens shutter for an exposure is very long, so that there is a risk of a shutter charge being lost.

In general, in charging a lens shutter, a driving member for driving shutter blades at a high speed should be rotated through a predetermined angle against a strong force of a driving spring In releasing on the other hand, all that is required is only to release the engagement of the driving member accumulating the returning energy. Therefore, the charging operation is much larger than releasing operation.

In the lens shutter driving method above described, the lens shutter is charged by a rotation of the driving ring in one direction and is released by a rotation of the driving ring in the reverse direction, the release operation is effected only by a final part of the rotating angle of the driving ring determined by the rotation in the charging direction.

In the second aspect of the invention, therefore, as shown in FIG. 5, the driving ring is driven from a release position (A) to an over-charged position (C') by the rotation of the motor in one direction in synchronism with a winding-up operation on the side of the camera. And the driving ring is driven in the reverse direction by the rotation of the motor in the reverse direction until the driving ring arrives at the charge-complete stopped position (C) by a first half of the reverse rotation of the motor which is stopped at the charge-complete stopped position (C).

In connection therewith, the blackout position (D) is also shifted by far to the left as the position (C). In this manner, the stroke from the charge-complete stopped position (C) through the blackout position (D) to the release position (A) is made considerably short, while the iris ring is separated from the driving ring and controlled by an iris driving lever provided on the side of the camera body, in the similar manner as in a lens for a focal plane shutter having no lens shutter The iris ring has been rotated linked with the rotation of the driving ring to open and close the iris in the prior art.

As a result, the time lag from the releasing operation on the side of the body to the actual exposure can be considerably shortened.

In contrast herewith, the stroke from the completion of operation of the lens shutter through the over-charged position to the stopped position is elongated so that the time for charging is somewhat elongated. However, this elongated time does not affect the shutter charge directly, so that it is not disadvantageous.

FIGS. 6 and 7 illustrate another embodiment of the lens shutter driving device for the above operation viewed from the rear and front sides of the camera, respectively. FIG. 7 shows only parts which are obscure in FIG. 6.

In this embodiment, a driving ring 3 is provided with only the bent portion 3b without providing the bent portions 3c and 3d in the previous embodiment, and iris spring 11 is anchored to an iris ring 2 and adapted to act in stopping-down direction so that the iris ring 2 is independent from the driving ring 3 and adapted to engage an iris driving lever 12.

Moreover, an operating ring 10 is rotatably provided in front of and concentric to the lens shutter. The operating ring 10 is formed with two protrusions 10a and 10b spaced apart from each other so that a bent portion 3b of the driving ring 3 engages the protrusion 10a or 10b of the operating ring 10 at an extreme end position of the driving ring 3 in normal or reverse rotation.

Moreover, the operating ring 10 is formed with bent portions 10c and 10d and a click hole 10e. The bent portions 10c and 10d are adapted to be engaged with and disengaged from a release lever 7 and a blade opening lever 8, respectively. The click hole 10e is adapted to engage a click ball 14 at the charge-complete stopped position A spring 13 is anchored between the click ball 14 and a stationary member.

FIGS. 8a-8d are development views similar to FIGS. 3a-3d, illustrating positional relations of respective members in respective operating positions. Only different arrangements from those of FIGS. 3a-3d will be explained hereinafter.

In a release position shown in FIG. 8a, the operating ring 10 is driven to the right by the driving ring 3 having a bent portion 3b directly driving the protrusion 10b of the operating ring 10 so that the bent portion 10c of the operating ring 10 drives the release lever 7 against its urging force to the right to actuate a shutter blade driving mechanism (not shown) in a lens shutter for an exposure.

From this position, when a motor 5 is energized in the charging direction to drive the driving ring 3 in the direction X, the charge lever 6 is driven to the left to charge the lens shutter in the same manner as in the previous embodiment. At the same time, the bent portion 3b of the driving ring 3 urges the protrusion 10a of the operating ring 10 in the direction X and the bent portion 10d drives the blade opening lever 8 normally urged in closing direction against its urging force in the blade opening direction. Thereafter, the inner surface of the bent portion 10d engages the tip end of the lever 8 to maintain the shutter blades opened. On the other hand, the click ball 14 is fitted in the click hole 10e so that the operating ring 10 is maintained at the position by the click fitting of the ball in the hole.

At the same time, the release lever 7 is released from the restriction of the bent portion 10c of the operating ring 10 to return to a position where the lens shutter blade driving mechanism is anchored in the charged position, thereby obtaining the over-charged position shown in Fig, 8c'.

In this status, moreover, when the motor 5 is energized in the reverse direction to drive the driving ring 3 in the direction Y, although the operating ring 10 is maintained in the condition shown in FIG. 8c', only the driving ring 3 is driven in the direction Y and the charge lever 6 is slightly returned by its urging force in the direction Y and kept in the charged position by release lever 7.

When the driving ring 3 has been advanced in the Y direction through a distance in excess of one half of its stroke, notches 9c and 9f of the positioning ring 9 moving together with the driving ring 3 are aligned with the first and second sensors $S_1$ and $S_2$ to deenergize the motor 5. This is the charge-complete stopped position C shown in FIG. 8c.

In photographing, when the release is effected on the side of the camera body, the driving ring 3 is rotated in the direction Y by the motor 5 so that the bent portion 3b of the driving ring 3 urges the protrusion 10b to drive the operating ring 10 in the direction Y.

As a result, the blade opening lever 8 is released from the restriction of the bent portion 10d and the notch 9e is aligned with the second sensor $S_2$ so that the blade opening lever 8 is returned to its original position to close the shutter blades. This position is the blackout position D shown in FIG. 8d. Thereafter, the release lever 7 is driven by the bent portion 10c of the operating ring 10 to effect an exposure. In this manner, these members are returned to the position shown in FIG. 8a.

While the driving ring 3 is being rotated, there is a chance that the positioning ring 9 assumes the same position as the charge-completed stopped position shown in FIG. 8c although the charge is not completed, which corresponds to that shown in FIG. 3b. However, any malfunction is not caused because of the trigger switch TS being kept off.

The positional information in the respective positions in this embodiment are shown in Table 2.

TABLE 2

|      |                              | $S_1$ | $S_2$ | TS |
|------|------------------------------|-------|-------|----|
| (A)  | Release position             | 0     | 0     | 1  |
| (C') | Over-charged position        | 1     | 0     | 0  |
| (C)  | Charge-complete stopped position | 1 | 1     | 0  |
| (D)  | Blackout position            | 0     | 1     | 0  |

A flow chart for carrying out such controls is shown in FIG. 9.

The initial position of the lens shutter 1 where the release operation is possible, is the charge-complete stopped position shown in FIG. 8c. At the commencement of the operation, when a release button on the camera body is pushed to turn a spare switch $SW_1$ (not shown) on, whether the driving ring 3 is in the charge-complete stopped position or not is detected at a step 1 with the aid of information from the sensors $S_1$ and $S_2$ and the trigger switch TS. After the driving ring 3 being at the charge-complete stopped position has been confirmed, whether a magnetic release switch $SW_2$ is on or off is detected at a step 2.

In case of the magnetic release switch $SW_2$ being on, the motor 5 is rotated in the release direction (at a step 4) and simultaneously a mirror starts to pivotally move upward on the side of the camera body and the iris ring 2 on the side of the lens shutter 1 is released from the restriction of the iris driving lever 12 and is set to a predetermined stop value by means of the iris spring 11.

When the motor 5 is rotated in the release direction to drive the driving ring 3 in the direction Y, the bent portion 3b of the driving ring 3 urges the protrusion 10b of the operating ring 10 into the direction Y and its bent portion 10d releases the blade opening lever 8 to close the shutter blades in the blackout position D shown in FIG. 8d.

Whether this position is the blackout position or not is judged by the conditions of the fist and second sensors $S_1$ and $S_2$ and the trigger shutter TS (a step 5). If it is the blackout position, the motor 5 is deenergized to stop it temporarily and a motor stop flag "1" is set (a step 6).

Further, whether a mirror has been moved upward or not is detected (a step 7). In case that the mirror was moved upward and the motor stop flag "1" was set, a preceding curtain of a focal plane shutter on a side of a camera body is moved (a step 9) to expose a film surface. Thereafter, the motor temporarily stopped at the step 6 is again energized in the release direction to rotate the driving ring 3 in the direction Y and current is supplied to a magnet for preventing the shutter blades from closing (a step 10).

At the end of the rotation of the driving ring 3 in the direction Y, the bent portion 10c of the operating ring 10 drives the release lever 7 into the release direction to open and close the shutter blades so as to effect an exposure. At the commencement of opening the shutter blades, the normally closed trigger switch TS is turned off (a step 11) to deenergize the motor 5 so that the count of the exposure time is started by an exposure time control circuit (a step 12).

Whether the count of the exposure time has been completed is detected at a step 13. In case of completion of the count, the current to the magnet is shut off to close the shutter blades. At the same time, a trailing curtain of the focal plane shutter on the side of the camera body is closed (a step 14). Then, the motor 5 is rotated in the charging direction to drive the driving ring 3 in the direction X into the over-charged position (C') (a step 16). Thereafter, the motor 5 is reversed in the releasing direction to rotate the driving ring 3 in the direction Y (a step 17).

When the driving ring 3 rotating in the direction Y arrives at the charge-complete stopped position (C) (a step 18), the motor is deenergized to stop all the series of operations and the lens shutter is held ready for releasing.

In the charge-complete stopped position, the operating ring 10 is click-stopped with the click ball 14 fitted in the click hole 10e of the operating ring 10. In the event that the operating ring 10 is unintentionally moved from the initial or normal position by large vibrations or shock or the operating ring 10 could not arrive at the initial position because consumption of a battery makes the charging impossible, the predetermined conditions in the step 1, are not fulfilled. In this case, the operating sequence is transferred from the step 1 to a step 15 where the motor is rotated in the normal direction. Thereafter, the lens shutter is charged and then the operating ring is brought into the charge-complete stopped position (a step 18). In this manner, the steps shown in the left of FIG. 5 are effected. Thereafter, the normal operating sequence is carried out.

When the battery is dead, it is of course required to replace it with a new battery.

In the above embodiment, the positioning ring 9 rotating together with the driving ring 3 is provided for judging the respective positions of the driving ring 3. Instead of the positioning ring 9, detecting means may be provided on the driving ring 3. The first and second sensors $S_1$ and $S_2$ may not be a transmission type and may be photointerrupters of a reflection type which utilize difference in reflection factor between the driving ring 3 and the positioning ring 9 for detecting the positions.

In this embodiment, as a third information source for detecting the positions and rotating directions of the driving ring 3, the trigger switch TS is used which makes the exposure time of the electronic shutter start. In case of a mechanically controlled lens shutter, however, a switch may be provided, whose conditions are different in charging and releasing processes, or a third sensor may be provided for detecting rotated positions of the operating ring 10 which does not rotate together with the driving ring 3 over all the rotating range.

FIGS. 10a–10d illustrate a further embodiment of the invention wherein rotated positions of the operating ring 10 are detected by a third sensor.

In this embodiment, the third sensor $S_3$ movable toward and away from the bent portion 10c of the operating ring 10 is provided, so that the third sensor $S_3$ provides the three bit information similar to those shown in Table 2 representative of the driven positions of the lens shutter with the aid of the first and second sensors $S_1$ and $S_2$.

Although the motor for driving the driving ring 3 has been shown as a reversible motor, this is only by way of example, and an ultrasonic motor or the like could be used which is annular and is able to be compactly provided at an outer circumference of the lens shutter.

FIG. 11 illustrates one embodiment of a lens barrel to which the lens shutter driving device is applied according to the invention.

The lens barrel 21 comprises a helicoid unit for adjusting focal points which comprises an inner helicoid 23 integrally fixed to a range adjusting ring 22, an external helicoid 24 threadedly engaged with the inner helicoid 23, and an internal helicoid 25 also threadedly engaged with the inner helicoid 23. The lens barrel 21 further comprises a bayonet mount 26 connected to the external helicoid 24.

To the internal helicoid 25 is fixed through a washer 27 by means of a nut 29 an electronic lens shutter 1 applicable to a single-lens reflex camera having a focal plane shutter. A front lens holding frame 30 for holding lenses $L_1$, $L_2$ and $L_3$ and a rear lens holding frame 31 for holding lenses $L_4$, $L_5$ and $L_6$ are threadedly engaged with the lens shutter 1.

The internal helicoid 25 is formed in its rear surface with a recess 25a as shown in FIG. 12 in detail. A motor 5 is fixed to the recess 25a by means of a metal fixture 33 and a motor holder 34. An axis of the motor 5 is directed perpendicularly to an axis of the internal helicoid 25 or an axis O of the lens shutter 1 (FIG. 11).

Figure 13:
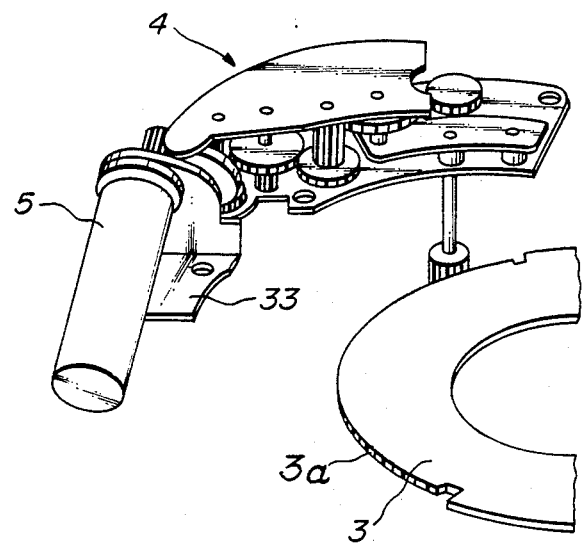
FIG. 13 is a perspective view illustrating a relation between the motor and a reduction gear train of the embodiment shown in FIG. 11.

The motor 5 is connected to tooth portion 3a of a driving ring 3 for driving the lens shutter 1 through a series of reduction gears 4 attached to a rear face of the internal helicoid 25 and including a bevel gear for changing a direction of transmission (FIG. 13). The motor is energized in normal or reverse direction to charge or release the lens shutter 1.

Figure 14:
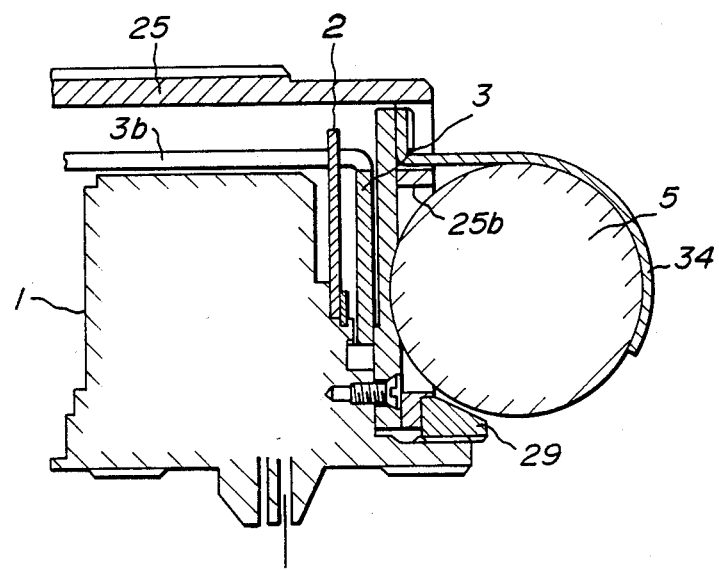
FIG. 14 is a longitudinal sectional view showing principal parts of another embodiment of the invention.

FIG. 14 illustrates a principal part of a further embodiment of the invention. In this embodiment, the motor 5 for driving the driving ring 3 in normal and reverse directions is fixed to a lens shutter 1, although the motor 5 has been shown fixed to the internal helicoid 25 in the preceding embodiment.

In more detail, the motor 5 integrally connected with a reduction gear assembly is fixed to a rear face of the lens shutter 1 in the same manner as in the preceding embodiment, so that the motor 5 extends through an opening 25b of the internal helicoid 25 into a rear space.

Therefore, the lens shutter 1 and the motor 5 are integrally connected with each other so that the productivity in assembling the lens barrel can be greatly improved Although the motor has been explained driving the lens shutter built in the interchangeable lens barrel for a single-lens reflex camera, this is only by way of example, and the kinds of the lens shutter and types of camera are not limited thereto.

Moreover, the motor may be provided in front of the lens shutter.

As can be seen from the above explanation, as the reversible motor is engaged in one rotating direction to charge the lens shutter and open shutter blades and energized in the opposite direction to close the shutter blades and then to release the shutter blades, complicated driving means on the side of the camera body for driving the lens shutter are not needed. Therefore, a lens having a lens shutter built therein can be interchangeably used without altering the mechanism in the camera body with or without a focal plane shutter.

Moreover, as the mechanical connection between the camera body and a lens barrel is not needed, the invention can be easily applied to a long focus lens whose moving stroke is very long and to a lens shiftable or swingable to a great extent. Therefore, the performance of a single-lens reflex camera with or without a focal plane shutter is remarkably improved.

According to the invention, as the time lag between a release on the side of the camera body and an actual operation of the lens shutter is shortened, moving objects can be easily photographed without loosing a shutter charge and the photographing range and usable range of electronic flashing can be greatly widened.

In the lens barrel having a lens shutter built therein and a helicoid telescopic mechanism, according to the invention, the motor for driving the lens shutter is arranged adjacent to either of lens holding frames on front and rear sides of the lens shutter such that the axis of the motor is perpendicular to the axial direction of the lens shutter. Therefore, a longitudinal end of the motor does not interfere with diverging light flux. Such an interference would occur in the prior art arrangement wherein axes of the motor and the lens shutter are arranged in parallel with each other. Therefore, the lens barrel is compactly constructed according to the invention.

Moreover, as the lens shutter is driven by the motor integrally provided with the lens shutter, the lens shutter can be very slightly driven without exerting any undue force on the camera body even in case of a long focus lens whose movable distance is long or shiftable or swingable lens.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of driving a lens shutter built in a lens barrel to be equipped on a single-lens reflex camera, said method comprising steps of charging said lens shutter, opening shutter blades of the lens shutter, closing said shutter blades and releasing said lens shutter, all these steps being caused by rotating a shaft of a reversible motor in one direction and a reverse direction.

2. A method of driving a lens shutter as set forth in claim 1, wherein said steps of charging said lens shutter and opening said shutter blades are effected during rotation of said motor in one direction, and said steps of closing said shutter blades and releasing said lens shutter are effected during rotation of said motor in a reverse direction.

3. A method of driving a lens shutter as set forth in claim 1, wherein said steps of charging said lens shutter and opening said shutter blades are effected during rotation of said motor in one direction, and said motor is rotated in a reverse direction, and on the way of the reverse rotation said motor is stopped and said lens shutter is maintained charged and said steps of closing said shutter blades and releasing said lens shutter are effected for a terminal part of the reverse rotation.

4. A device for driving a lens shutter built in a lens to be equipped on a single-lens reflex camera, said device comprising a driving ring for charging said lens shutter and then opening shutter blades of the lens shutter by rotation of said driving ring in one direction and for closing said shutter blades and then releasing said lens shutter by rotation of said driving ring in a reverse direction, a motor for driving said driving ring in normal and reverse directions, position detecting means for detecting rotated position and rotating directions of said driving ring, and control means for controlling rotations of said motor in the normal and reverse directions with the aid of output signals from said position detecting means.

5. A device for driving a lens shutter as set forth in claim 4, wherein said driving ring is in the form of a disc formed with a driven portion connected to said reversible motor, bent portions engageable with a charge lever, a release lever and a blade opening lever, respectively, and said bent portion engageable with the charge lever being connected to said position detecting means.

6. A device for driving a lens shutter built in a lens to be equipped on a single-lens reflex camera, said device comprising a driving ring for charging said lens shutter by rotation of said driving ring in one direction and for releasing said lens shutter by rotation of said driving ring in a reverse direction, a motor for driving said driving ring in normal and reverse directions, an operating ring engaging said driving ring at ends of the normal and reverse rotations of the driving ring to rotate in charging and releasing directions together with the driving ring for opening shutter blades of said lens shutter by the rotation in the charging direction and closing said shutter blades and then releasing said lens shutter by the rotation in the release direction, position detecting means for detecting rotated positions and rotating directions of said driving ring, and control means for controlling rotations of said motor in the normal and reverse directions with the aid of output signals from said position detecting means.

7. A device for driving a lens shutter as set forth in claim 6, wherein said driving ring is in the form of a disc provided with a bent portion engageable with said operating ring and connected to said position detecting mean, and said operating ring is rotatably provided in front of and concentric to said lens shutter and formed with two protrusions spaced apart from each other and engageable with said bent portion of said driving ring at end positions of said driving ring in normal and reverse rotations, and said operating ring is further formed with bent portions and a click hole, said bent portions engageable with a release lever and a blade opening lever, respectively and said click hole engageable with a click ball in a charge-complete stopped position, said click ball being urged by a spring between the click ball and a stationary member.

8. A device for driving a lens shutter as set forth in claim 7, wherein an iris ring is provided independently from said driving ring and is urged to stopping-down direction and engageable with an iris driving lever on a side of a camera body.

9. A device for driving a lens shutter as set forth in claim 4 or 6, wherein said position detecting means comprises first and second sensors for detecting rotated positions of said driving ring and a trigger switch for causing electronic count of exposure time of said lens shutter to start.

10. A device for driving a lens shutter as set forth in claim 6, wherein said position detecting means comprises first and second sensors for detecting rotated positions of said driving ring and a third sensor for detecting rotated positions of said operating ring.

11. A device for driving a lens shutter as set forth in claim 4 or 6, wherein said position detecting means comprises a positioning ring arranged concentrically to said lens shutter and formed with two projections between which a bent portion of said driving ring causes the positioning ring to rotate together with said driving ring and further formed with two sets of notches, and said position detecting means further comprises first and second sensors, thereby detecting the rotations of the driving ring from relative positions between said notches formed in said positioning ring and said first and second sensors.

12. A device for driving a lens shutter as set forth in claim 4 or 6, wherein said motor is arranged in a lens barrel having a lens shutter built therein and adjacent to either of front and rear lens holding frames of said lens barrel, an axis of said motor being substantially perpendicular to an axis of said lens shutter.

13. A device for driving a lens shutter as set forth in claim 12, wherein said lens barrel includes a helicoid unit for adjusting focal points comprising an internal helicoid and an external helicoid thereby engaged with each other through an inner helicoid, and said motor is fixed to said internal helicoid.

14. A device for driving a lens shutter as set forth in claim 12, wherein said motor is fixed to said lens shutter.

* * * * *

UNITED STATES PATENT AND TRADEMARK OFFICE
CERTIFICATE OF CORRECTION

PATENT NO. : 4,839,680

DATED : June 13, 1989

INVENTOR(S) : Mitsumasa Amada, et al.

It is certified that error appears in the above-identified patent and that said Letters Patent is hereby corrected as shown below:

On the title page:

In the Abstract, line 15, delete "during which".

Column 2, line 53, change "converged" to --converge--.

Column 4, line 7, change "." to --;--;

line 10, change "3a-3b" to --3a-3d--;

line 22, change "8a-8b" to --8a, 8c', 8c, 8d--;

line 27, change "10a-10b" to --10a, 10c', 10c, 10d--.

Column 7, line 64, after "spring" insert --.--.

Column 8, line 27, after "shutter" insert --.--; (2nd occur)

line 64, after "position" insert --.--.

Column 10, line 40, change "fist" to --first--.

Signed and Sealed this

Twenty-second Day of May, 1990

Attest:

HARRY F. MANBECK, JR.

*Attesting Officer*     *Commissioner of Patents and Trademarks*